(12) United States Patent
Zhang et al.

(10) Patent No.: US 11,500,717 B2
(45) Date of Patent: Nov. 15, 2022

(54) METHOD FOR DETECTING DATA STORAGE SYSTEM, DEVICE AND DATA STORAGE SYSTEM

(71) Applicant: EMC IP Holding Company LLC, Hopkinton, MA (US)

(72) Inventors: Min Zhang, Shanghai (CN); Zhonghua Zhu, Shanghai (CN); Guifeng Tang, Shanghai (CN); Qiulin Cheng, Shanghai (CN); Yechen Huang, Shanghai (CN); Zhenhua Dong, Shanghai (CN); Thomas Dibb, Rutland, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 203 days.

(21) Appl. No.: 16/936,709

(22) Filed: Jul. 23, 2020

(65) Prior Publication Data

US 2022/0027227 A1    Jan. 27, 2022

(51) Int. Cl.
*G06F 11/00*   (2006.01)
*G06F 11/07*   (2006.01)
*G06F 13/42*   (2006.01)
*G06F 13/40*   (2006.01)

(52) U.S. Cl.
CPC ...... *G06F 11/0793* (2013.01); *G06F 11/0727* (2013.01); *G06F 11/0751* (2013.01); *G06F 11/0772* (2013.01); *G06F 13/4022* (2013.01); *G06F 13/4282* (2013.01); *G06F 2213/0026* (2013.01)

(58) Field of Classification Search
CPC ............ G06F 11/0727; G06F 11/0751; G06F 11/0772; G06F 11/0793
See application file for complete search history.

(56) References Cited

U.S. PATENT DOCUMENTS

| | | | |
|---|---|---|---|
| 6,490,544 B1 | 12/2002 | Diamond et al. | |
| 6,647,516 B1 | 11/2003 | Rust et al. | |
| 6,886,116 B1 | 4/2005 | Maclellan et al. | |
| 7,020,803 B2 | 3/2006 | Wolin et al. | |
| 7,389,396 B1 * | 6/2008 | Goel .................. | G06F 11/2094 714/48 |
| 8,055,934 B1 * | 11/2011 | Blinick .............. | G06F 11/2033 714/4.11 |
| 10,255,172 B1 | 4/2019 | Kucherov et al. | |
| 10,514,978 B1 * | 12/2019 | Lee ..................... | G06F 11/008 |

(Continued)

FOREIGN PATENT DOCUMENTS

| CN | 111367838 A | 7/2020 |
|---|---|---|
| CN | 111865629 A | 10/2020 |

*Primary Examiner* — Joshua P Lottich
(74) *Attorney, Agent, or Firm* — BainwoodHuang

(57) ABSTRACT

Techniques involve: acquiring, through a first downstream port of a first switch of a data storage system, information indicating an error of a storage device array from a second switch of the data storage system, wherein the first switch and the second switch are connected to the storage device array and the first downstream port is connected to a second downstream port of the second switch; executing, based on the acquired information, actual actions intended for solving the error; and in response to the executed actual actions failing to match with expected actions for the error, issuing an alarm indicating failure of processing the error.

18 Claims, 4 Drawing Sheets

(56) References Cited

U.S. PATENT DOCUMENTS

| | | | |
|---|---|---|---|
| 2012/0266027 A1* | 10/2012 | Itoyama | G06F 11/0727 |
| | | | 714/E11.159 |
| 2012/0297052 A1* | 11/2012 | Qin | G06F 11/0751 |
| | | | 709/224 |
| 2013/0339826 A1* | 12/2013 | Freking | H04L 1/0057 |
| | | | 714/799 |
| 2015/0317272 A1* | 11/2015 | Tanaka | G06F 13/385 |
| | | | 710/301 |
| 2018/0011763 A1* | 1/2018 | Tanaka | G06F 11/1076 |
| 2018/0217887 A1* | 8/2018 | Rueger | G06F 11/0727 |
| 2020/0241985 A1 | 7/2020 | Zhang et al. | |

\* cited by examiner

METHOD FOR DETECTING DATA STORAGE SYSTEM, DEVICE AND DATA STORAGE SYSTEM

FIELD

Embodiments of the present disclosure relate to the field of fault detection, and more specifically, to a method and device for detecting a data storage system.

BACKGROUND

Along with the development of data storage techniques, storage servers usually need to manage storage systems containing a large amount of disks and the storage servers are often connected with the disks by a bus to transmit information. In the storage architecture with bus interconnections, if an error occurs in a disk, it is usually required to execute a corresponding error response mechanism for the error. Therefore, the task of ensuring that a corresponding response is made in an occurrence of error is worth studying.

SUMMARY

Embodiments of the present disclosure provide method for detecting data storage system, device and data storage system.

In a first aspect of the present disclosure, there is provided a method for detecting a data storage system. The method includes: acquiring, through a first downstream port of a first switch of the data storage system, information indicating an error of a storage device array from a second switch of the data storage system, wherein the first switch and the second switch are connected to the storage device array and the first downstream port is connected to a second downstream port of the second switch; executing, based on the acquired information, actual actions intended for solving the error; and in response to the executed actual actions failing to match with expected actions for the error, issuing an alarm indicating failure of processing the error.

In some embodiments, the acquired information indicating an error of a storage device array is inputted at a second downstream port of the second switch and transmitted to the first switch via the first downstream port.

In some embodiments, the switch is a PCIe (Peripheral Component Interconnect Express) switch.

In a second aspect of the present disclosure, there is provided an electronic device. The electronic device includes a processor and a switch, wherein the processor is configured to execute the method according to the first aspect of the present disclosure.

In a third aspect of the present disclosure, there is provided a data storage system. The data storage system includes: a first switch including a first downstream port; a second switch including a second downstream port connected to the first downstream port; a first processor connected to the first switch via an upstream port of the first switch; a second processor connected to the second switch via an upstream port of the second switch; a storage device array to which both the first switch and the second switch are connected; wherein the first switch is configured to acquire, through the first downstream port, information indicating an error of the storage device array inserted at the second downstream port.

In some embodiments, the first switch is configured to execute the method according to the first aspect of the present disclosure.

In some embodiments, a third downstream port of the first switch is configured to connect a fourth downstream port of the second switch; a first downstream port group of the first switch is configured to send, via an upstream port of the first switch, information from connected storage devices to the first processor; a second downstream port group of the first switch is configured to send, via the third downstream port and the fourth downstream port, information from connected storage devices to the second processor; a third downstream port group of the second switch is configured to send, via an upstream port of the second switch, information from connected storage devices to the second processor; a fourth downstream port group of the second switch is configured to send, via the first downstream port and the second downstream port, information from a connected storage device to the first processor.

In some embodiments, the first switch includes: a first upstream port configured to connect the first downstream port group; and a second upstream port configured to connect, via the first downstream port and the second downstream port, the fourth downstream port group; the second switch includes: a third upstream port configured to connect the third downstream port group; and a fourth upstream port configured to connect, via the third downstream port and the fourth downstream port, the second downstream port group.

In some embodiments, the first downstream port group, the second downstream port group, the third downstream port group and the fourth downstream port group are configured to have the same number of downstream ports.

This Summary is provided to introduce a selection of concepts that are further described below in the Detailed Description in a simplified form. This Summary is not intended to identify key features or essential features of the present disclosure, nor is it intended to be used to limit the scope of the present disclosure.

BRIEF DESCRIPTION OF THE DRAWINGS

Through the following more detailed description of the example embodiments of the present disclosure with reference to the accompanying drawings, the above and other objectives, features, and advantages of the present disclosure will become more apparent, wherein the same reference sign usually refers to the same component in the example embodiments of the present disclosure.

DETAILED DESCRIPTION OF EMBODIMENTS

The individual features of the various embodiments, examples, and implementations disclosed within this document can be combined in any desired manner that makes technological sense. Furthermore, the individual features are hereby combined in this manner to form all possible combinations, permutations and variants except to the extent that such combinations, permutations and/or variants have been explicitly excluded or are impractical. Support for such combinations, permutations and variants is considered to exist within this document.

It should be understood that the specialized circuitry that performs one or more of the various operations disclosed herein may be formed by one or more processors operating in accordance with specialized instructions persistently stored in memory. Such components may be arranged in a variety of ways such as tightly coupled with each other (e.g., where the components electronically communicate over a computer bus), distributed among different locations (e.g., where the components electronically communicate over a computer network), combinations thereof, and so on.

Preferred embodiments of the present disclosure will be described in more details below with reference to the drawings. Although the drawings illustrate preferred embodiments of the present disclosure, it should be appreciated that the present disclosure can be implemented in various manners and should not be limited to the embodiments explained herein. On the contrary, the embodiments are provided to make the present disclosure more thorough and complete and to fully convey the scope of the present disclosure to those skilled in the art.

As used herein, the term "includes" and its variants are to be read as open-ended terms that mean "includes, but is not limited to." The term "or" is to be read as "and/or" unless the context clearly indicates otherwise. The term "based on" is to be read as "based at least in part on." The terms "one example embodiment" and "one embodiment" are to be read as "at least one example embodiment." The term "a further embodiment" is to be read as "at least a further embodiment." The terms "first", "second" and so on can refer to same or different objects. The following text also can include other explicit and implicit definitions.

Figure 1:
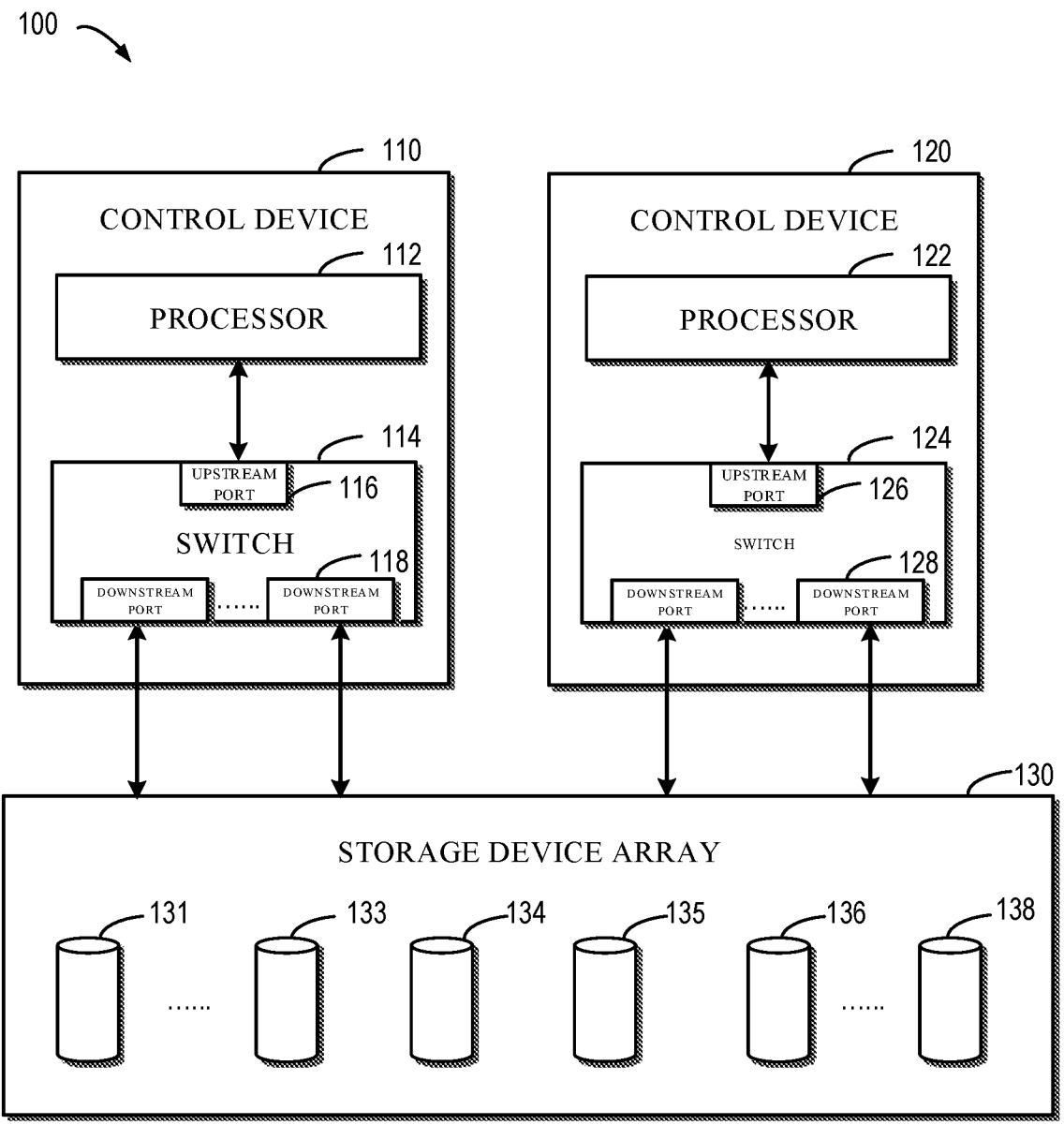
FIG. 1 illustrates a schematic diagram of architecture of a data storage system in accordance with embodiments of the present disclosure.

FIG. 1 illustrates a schematic diagram of architecture of a data storage system 100 in accordance with embodiments of the present disclosure. It should be understood that structure and function of the data storage system 100 are described for the purpose of examples only without suggesting any restrictions over the scope of the present disclosure. Embodiments of the present disclosure also can be applied into the data storage system 100 having different structures and/or functions.

As shown in FIG. 1, a storage device array 130 for non-volatile storage data is deployed in the data storage system 100. The storage device array 130 can include a plurality of storage device units 131-138. It should be appreciated that the number of storage device units shown in FIG. 1 is only by way of example and is not intended for limiting the scope of the present disclosure. The storage device array 130 can serve, via a control device 110, users' access requests for data.

A switch 114 of the bus is usually required to interconnect a plurality of storage device units 131-138 with the control device 110 for data access. For example, when the bus is PCIe bus, a corresponding PCIe switch can be adopted.

The switch 114 includes an upstream port 116 connected to a processor 112 and a downstream port 118 connected to the storage device array 130. When the control device 110 receives a data access request from a user, the processor 112 is configured to form a link between the upstream port 116 and the downstream port 118 of the switch 114, such that the data access request of the user can reach corresponding storage device units 131-138 in the storage device array 130. It should be appreciated that the number of upstream ports and downstream ports of the switch shown in FIG. 1 is only by way of example and is not intended for restricting the scope of the present disclosure.

In FIG. 1, the data storage system 100 also includes a further control device 120, which can serve, in parallel with the control device 110, data access requests from the users. The control device 120 also includes a processor 122 and a switch 124 and has functions and architecture similar to the control device 110. The functions and architecture will not be repeated here.

The storage device units 131-138 in the storage device array each are respectively connected to the downstream ports of the switches 114 and 124, such that the two control devices 110 and 120 can access data in each of the storage device units 131-138.

For the sake of clarity, the control device 110 is also referred to as first control device 110 and the further control device 120 is also referred to as second control device 120. The processor 112 and the switch 114 of the first control device 110 are respectively referred to as first processor 112 and first switch 114, and the processor 122 and the switch 124 of the second control device 120 are respectively referred to as second processor 122 and second switch 124. The first control device 120 and the second control device 150, for example, can be storage processor.

In the embodiment illustrated in FIG. 1, when an error occurs in a certain storage unit of the storage device 130, information containing the error, e.g. data packet, will be generated. The information should be transmitted, via the switches 114 and 124 of the control devices 110 and 120, to the processors 112 and 122, which accordingly can take corresponding counter measures for the error. Therefore, it is extremely necessary to ensure that the information containing the error can reach the processor and the processor of the control device can take countermeasures in line with expectations.

However, an occurrence of error in storage device units 131-138 is an event of low probability and the type of the error cannot be controlled. A manufacturer of the storage device unit usually does not provide a method for manually inserting an error at the storage device unit, resulting into difficulties in detecting an error response mechanism for the data storage system.

For this, the invention recognized that by appropriately configuring the link relation between the upstream port and the downstream port in the switch, the errors in the storage device unit can be simulated with the help of inserting information of a particular error at the switch. Here, the inserted errors, for example, can involve PCIe and/or NVMe (non-volatile memory express) errors. The error processing mechanism of the entire data storage system can be verified by checking the processing of the error.

It should be understood that the port connecting with the processor in the switch is referred to as upstream port and the port connecting with the storage device in the switch is referred to as downstream port to facilitate description. The expressions of "upstream port" and "downstream port" are not intended for restricting the transmission direction of the data.

Figure 2:
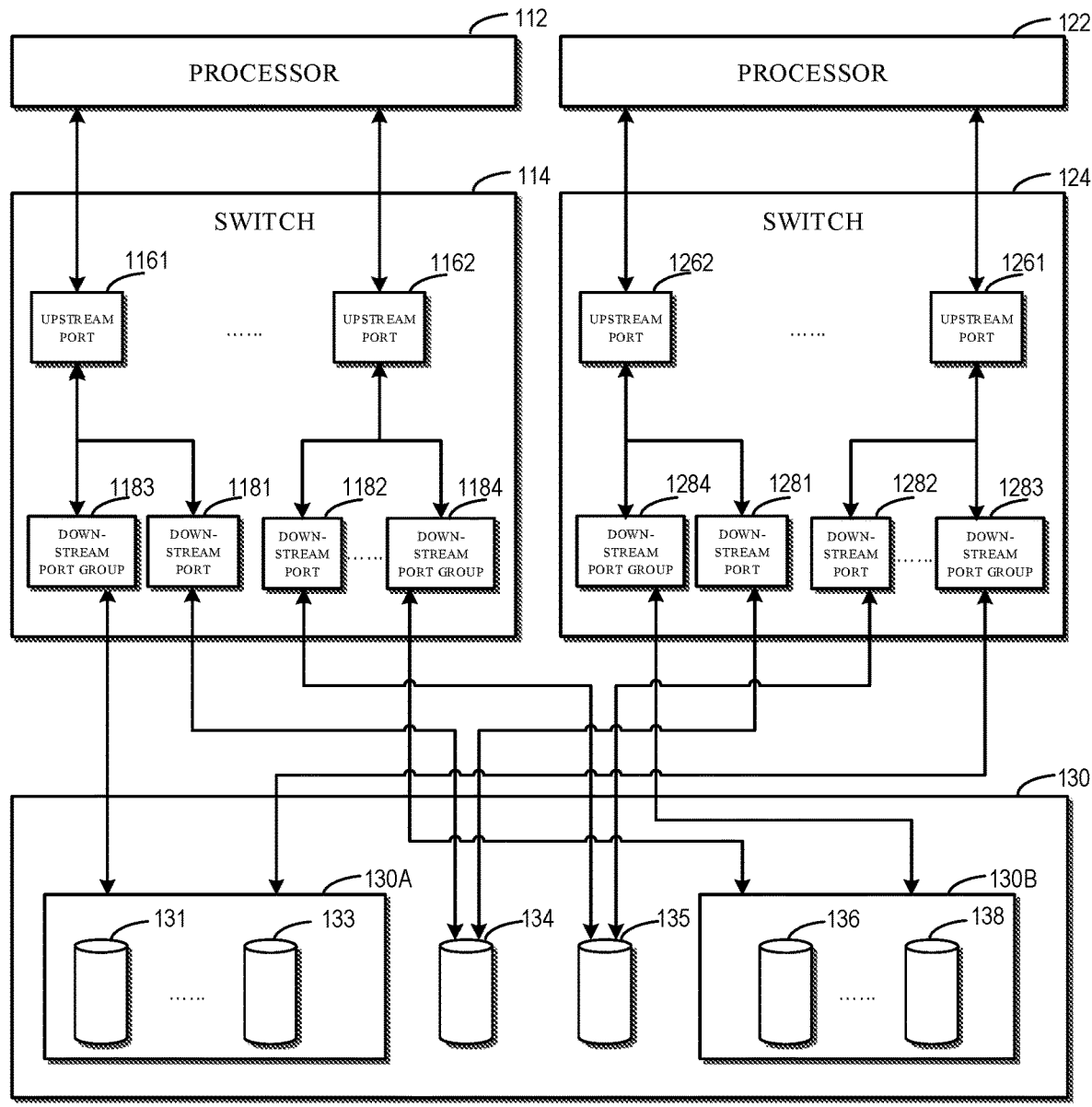
FIG. 2 illustrates a schematic diagram of connections of the switches of the data storage system during normal operation in accordance with embodiments of the present disclosure.

FIG. 2 illustrates a schematic diagram of connections of the switches 114 and 124 of the data storage system 100 during normal operation in accordance with embodiments of the present disclosure. The following explanation is provided mainly by taking the side of the first switch 114 as the example. Downstream ports 1181 and 1182 or downstream port groups 1183 and 1184 of the first switch 114 are respectively connected with storage device units 131-138 in the storage device array 130, resulting into a particular corresponding relation between the downstream port and the storage device unit. When the data access request of the user reaches the upstream ports 1161 and 1162 of the first switch 114, the first switch 114 will establish a link between the upstream port and the downstream port in accordance with the storage device unit where the data to be accessed by the user are located. Therefore, the upstream port of the first switch 114 is respectively linked with the upstream port of the first switch 114 for data transfer. It should be understood that the number of upstream ports and downstream ports of the first switch 112 of the first switch 112 is only by way of example and is not intended for restricting the scope of the present application. In addition, the downstream port groups 1183 and 1184 can include, without limitations, one or more downstream ports.

FIG. 2 also illustrates a schematic diagram at the side of the second switch 124. Here, the second switch 124 has the same structure as the first switch 114 and the downstream ports or the downstream port groups of the second switch 124 also are respectively connected with the storage device units 131-138 in the storage device array 130. In other words, the storage device units 131-138 in the storage device array 130 each are separately connected with one downstream port of the first switch 114 and one downstream port of the second switch 124, and the second control device 120 accordingly can be considered as a peer node of the first control device 110.

As the first switch 114 and the second switch 124 are in the operating state as shown in FIG. 2, if an error, for example, occurs on the storage device unit 134, information containing the error (e.g., data packet) is transmitted to the first processor 112 via the link where the downstream port 1181 and the upstream port 1161 of the first switch 114 are located. After receiving the information, the first processor 112 will make a corresponding response to the error, such as rebooting the storage device unit 134, and transmit the response back to the storage device unit 134 along the same link.

Meanwhile, an error occurring on the storage device unit 134 also will be transmitted, for example in the form of a packet, to the second processor 122 via a link where the downstream port 1281 and the upstream port 1262 of the second switch 124 are located. After receiving the information, the second processor 122 also makes a corresponding response to the error.

However, as mentioned above, the error occurring on the storage device unit 134 is of low probability and cannot be controlled. Accordingly, there is required a method and system for fault detection, which can simulate the errors occurring on the storage device unit 134, so as to detect whether the response of the processor to the error is in line with the expectation.

Figure 3:
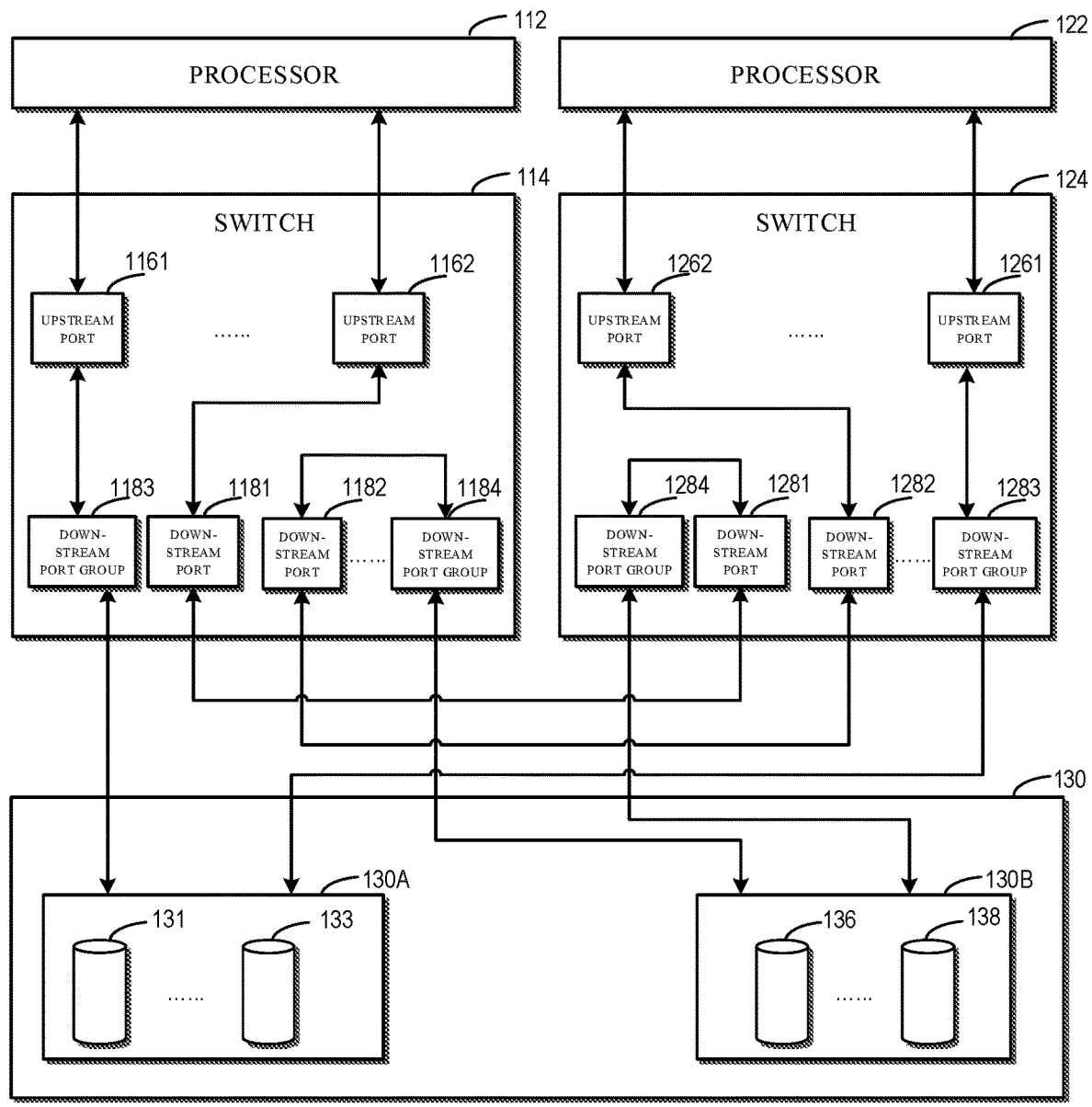
FIG. 3 illustrates a schematic diagram of connections of the switches of the data storage system during detection in accordance with embodiments of the present disclosure.

FIG. 3 illustrates a schematic diagram of connections of the switches 114 and 124 of the data storage system 100 during detection in accordance with embodiments of the present disclosure. As shown in FIG. 3, a first downstream port 1181 of the first switch 114 is connected to a second downstream port 1281 of the second switch 124, which can be implemented, for example, by removal of the storage device unit 134 at the storage device array 130 and short circuit between corresponding input and output lines in the slot interface.

In this way, the first switch 114 can acquire, through the connection between the first downstream port 1181 and the second downstream port 1281, information from the second switch 124. When the information indicating errors of the storage device unit is manually inserted at the second downstream port 1281 of the second switch 124, the information can be transmitted to the first switch 114 and further to the first processor 112, to detect the counter measures adopted by the first control device 110 for the error.

For example, when the information indicating errors is inserted at the second downstream port 1281, the first control device 110 makes no responses and it accordingly can be determined that the information fails to reach the first processor 112 of the first control device 110, so as to further determine that a fault is present at a communication path from the storage device unit 134 to the first processor 112.

Furthermore, after successfully acquiring the information and performing, based on the acquired error-related information, actual actions to solve the error, the first processor 112 can detect whether the performed actual actions match with expected actions for the error. If not, it also can be determined that a fault exists on the communication path from the storage device unit 134 to the first processor 112. The first processor 112 also can issue an alarm indicating presence of the fault based on the detection result.

In some embodiments, in order to maintain the first processor 112 and the second processor 114 in a normal operating state before inserting an error in the second switch 124, the downstream port/the downstream port group of the first switch 114 is such configured that: the third downstream port 1182 of the first switch 114 connects with the fourth downstream port 1282 of the second switch 124 (which, for example, is implemented by removal of the storage device unit 135 at the storage device array 130 and short circuit between corresponding input and output lines in a slot interface); the first downstream port group 1183 of the first switch 114 sends, via the first upstream port 1161 of the first switch, the information from the connected storage device unit 130A to the first processor 112; the second downstream port group 1184 of the first switch 114 sends, via the third downstream port 1182 and the fourth downstream port 1282, the information from the connected storage device unit 130B to the second processor 122; the third downstream port group 1283 of the second switch 124 sends, via the first upstream port 1261 of the second switch 124, the information from the connected storage device unit 130A to the second processor 122; and the fourth downstream port group 1284 of the second switch sends, via the second downstream port 1281 and the first downstream port 1181, the information from the connected storage device unit 130B to the first processor 112.

Here, the storage device units 131-138 in the storage device array 130 can be divided into two types:

First type: the storage device unit is connected with downstream ports of the switch of the control device (first control device 110 or second control device 120) and simultaneously communicates with the processor of the control device, e.g., storage device unit 130A in FIG. 3;

Second type: the storage device unit is connected with downstream ports of the switch of the control device (first control device 110 or second control device 120) and simultaneously communicates with a processor of a further control device, e.g. storage device unit 130B in FIG. 3.

In this way, the first control device 110 and the second control device 120 are respectively connected with the same number of storage device units 131-138. Therefore, before inserting the information indicating an error, the first control device 110 and the second control device 120 assume that the data storage system 100 is still in the normal operating state, so as to establish required working environment for the subsequent check. In this case, when the information indicating an error of the storage device array is inserted at the second downstream port 1281 of the second switch 124, the entire procedure from normal operation to fault occurrence of the storage device array can be simulated to increase the reliability of the detection.

In some embodiments, the first switch can include a first upstream port 1161 configured to connect the first downstream port group 1183, and a second upstream port 1162 configured to connect, via the first downstream port 1181 and the second downstream port 1281, the fourth downstream port group 1284; however, the second switch includes a third upstream port 1261 configured to connect the third downstream port group 1283 and a fourth upstream port 1262 configured to connect, via the third downstream port 1282 and the fourth downstream port 1182, the second downstream port group 1184.

Accordingly, the above first type of storage device unit 130A and the second type of storage device unit 130B communicate with the processor respectively through separate upstream ports, which facilitates the processor to determine the source of the information indicating the error of the storage device array.

In some embodiments, the first downstream port group 1183, the second downstream port group 1184, the third downstream port group 1283 and the fourth downstream port group 1284 are configured to have the same number of downstream ports.

In this way, the number of the storage device units 130A belonging to the first type and the number of storage device units 130B belonging to the second type in the storage device array 130 are identical. Therefore, the storage device units are symmetrically and respectively connected with the first upstream port 1161 and the second upstream port 1162 in the first switch 114 as well as with the third upstream port 1261 and the fourth upstream port 1262 in the second switch 124 to optimize the connection distribution of the storage device units.

Figure 4:
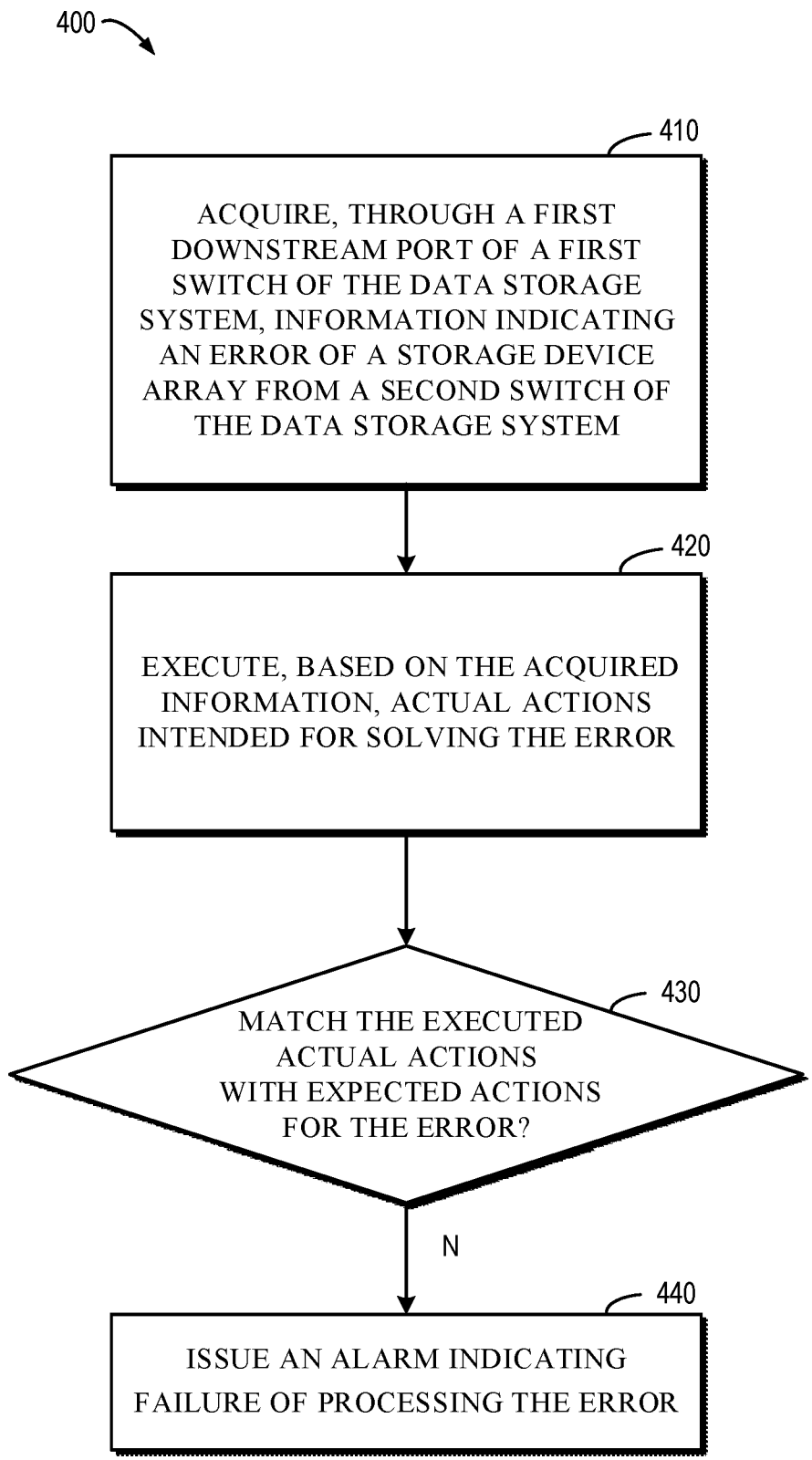
FIG. 4 illustrates a flowchart of a method for detecting a data storage system in accordance with embodiments of the present disclosure.

FIG. 4 illustrates a flowchart of a method 400 for detecting a data storage system in accordance with embodiments of the present disclosure. The method 400 can be implemented in the first control device 110 and the second control device 120 of FIG. 1.

At block 410, the information indicating an error of the storage device array is acquired via the first downstream port of the first switch of the data storage system from the second switch of the data storage system, wherein both the first switch and the second switch are connected to the storage device array and the first downstream port is connected to the second downstream port of the second switch.

At block 420, the actual actions, which are intended for solving the error, are executed based on the acquired error information.

At block 430, it is determined whether the executed actual actions match with the expected actions for the error. If not, an alarm indicating the failure of processing the error is issued at block 440.

In some embodiments, a set of data storage operations which stores data into and/or retrieves data from the storage device array is performed by the control devices on behalf of a set of external devices. Such a set of data storage operations is performed while concurrently acquiring, executing, and issuing thus verifying error handling during a normal operating condition.

Embodiments of the present disclosure simulates, through changing a link connection of the switch, a potential error at the storage device with the help of inserting a test signal at the switch, so as to detect whether the counter measures of the control device for the error are in line with expectations. Therefore, safety and reliability of the entire data storage system are enhanced.

Various embodiments of the present disclosure have been described above and the above description is only by way of example rather than exhaustive and is not limited to the embodiments disclosed herein. Many modifications and alterations, without deviating from the scope and spirit of the explained various embodiments, are obvious for those skilled in the art. The selection of terms in the text aims to best explain principles and actual applications of each embodiment and technical improvements made to the technology in the market by each embodiment, or enable other ordinary skilled in the art to understand embodiments of the present disclosure.

We claim:

1. A method for detecting a data storage system, comprising:
   acquiring, through a first downstream port of a first switch of the data storage system, information indicating an error of a storage device array from a second switch of the data storage system, wherein the first switch and the second switch are connected to the storage device array and the first downstream port is connected to a second downstream port of the second switch;
   executing, based on the acquired information, actual actions intended for solving the error; and
   in response to the executed actual actions failing to match with expected actions for the error, issuing an alarm indicating failure of processing the error.

2. The method of claim 1, wherein the acquired information indicating the error of the storage device array is inputted at the second downstream port of the second switch and transmitted to the first switch via the first downstream port.

3. The method of claim 1, wherein each switch is a PCIe (Peripheral Component Interconnect Express) switch.

4. The method of claim 1, further comprising:
   performing a set of data storage operations which stores data into and retrieves data from the storage device array on behalf of a set of external devices while concurrently acquiring, executing, and issuing.

5. A data storage system, comprising:
   a first switch including a first downstream port;
   a second switch including a second downstream port connected to the first downstream port;
   a first processor connected to the first switch via an upstream port of the first switch;
   a second processor connected to the second switch via an upstream port of the second switch; and
   a storage device array to which both the first switch and the second switch are connected;
   wherein the first switch is configured to acquire, through the first downstream port, information indicating an error of the storage device array inserted at the second downstream port; and
   wherein the first switch is configured to execute a method which includes:
      acquiring, through the first downstream port of the first switch of the data storage system, the information indicating the error of the storage device array from the second switch of the data storage system;
      executing, based on the acquired information, actual actions intended for solving the error; and
      in response to the executed actual actions failing to match with expected actions for the error, issuing an alarm indicating failure of processing the error.

6. The data storage system of claim 5, wherein
the first downstream port of the first switch is configured to connect the second downstream port of the second switch;
a third downstream port of the first switch is configured to connect a fourth downstream port of the second switch;
a first downstream port group of the first switch is configured to send, via an upstream port of the first switch, information from connected storage devices to the first processor;
a second downstream port group of the first switch is configured to send, via the third downstream port and the fourth downstream port, information from connected storage devices to the second processor;
a third downstream port group of the second switch is configured to send, via an upstream port of the second switch, information from connected storage devices to the second processor;
a fourth downstream port group of the second switch is configured to send, via the first downstream port and the second downstream port, information from a connected storage device to the first processor.

7. The data storage system of claim 6,
wherein the first switch comprises:
a first upstream port configured to connect the first downstream port group; and
a second upstream port configured to connect, via the first downstream port and the second downstream port, the fourth downstream port group;
wherein the second switch comprises:
a third upstream port configured to connect the third downstream port group; and
a fourth upstream port configured to connect, via the third downstream port and the fourth downstream port, the second downstream port group.

8. The data storage system of claim 7, wherein the first downstream port group, the second downstream port group, the third downstream port group and the fourth downstream port group are configured to have the same number of downstream ports.

9. The data storage system of claim 5, wherein the acquired information indicating the error of the storage device array is inputted at the second downstream port of the second switch and transmitted to the first switch via the first downstream port.

10. The data storage system of claim 5, wherein each switch is a PCIe (Peripheral Component Interconnect Express) switch.

11. The data storage system of claim 5 wherein the method further includes:
performing a set of data storage operations which stores data into and retrieves data from the storage device array on behalf of a set of external devices while concurrently acquiring, executing, and issuing.

12. An electronic device, comprising:
a processor and a first switch which are operative to form at least part of a data storage system, wherein the processor is constructed and arranged to:
acquire, through a first downstream port of the first switch of the data storage system, information indicating an error of a storage device array from a second switch of the data storage system, wherein the first switch and the second switch are connected to the storage device array and the first downstream port is connected to a second downstream port of the second switch,
execute, based on the acquired information, actual actions intended for solving the error, and
in response to the executed actual actions failing to match with expected actions for the error, issue an alarm indicating failure of processing the error.

13. The electronic device of claim 12, wherein the acquired information indicating the error of the storage device array is inputted at the second downstream port of the second switch and transmitted to the first switch via the first downstream port.

14. The electronic device of claim 12, wherein the first switch and the second switch are PCIe (Peripheral Component Interconnect Express) switches.

15. The electronic device of claim 12, wherein the processor is further constructed and arranged to:
perform a set of data storage operations which stores data into and retrieves data from the storage device array on behalf of a set of external devices while concurrently acquiring the information indicating the error, executing the actual actions, and issuing the alarm.

16. The electronic device of claim 12, wherein
the first downstream port of the first switch is configured to connect the second downstream port of the second switch;
a third downstream port of the first switch is configured to connect a fourth downstream port of the second switch;
a first downstream port group of the first switch is configured to send, via an upstream port of the first switch, information from connected storage devices to the first processor;
a second downstream port group of the first switch is configured to send, via the third downstream port and the fourth downstream port, information from connected storage devices to the second processor;
a third downstream port group of the second switch is configured to send, via an upstream port of the second switch, information from connected storage devices to the second processor;
a fourth downstream port group of the second switch is configured to send, via the first downstream port and the second downstream port, information from a connected storage device to the first processor.

17. The electronic device of claim 12, wherein the first switch comprises:
a first upstream port configured to connect the first downstream port group; and
a second upstream port configured to connect, via the first downstream port and the second downstream port, the fourth downstream port group;
wherein the second switch comprises:
a third upstream port configured to connect the third downstream port group; and
a fourth upstream port configured to connect, via the third downstream port and the fourth downstream port, the second downstream port group.

18. The electronic device of claim 12, wherein the first downstream port group, the second downstream port group, the third downstream port group and the fourth downstream port group are configured to have the same number of downstream ports.

* * * * *